United States Patent [19]

Smith

[11] 4,245,424
[45] Jan. 20, 1981

[54] TRAP SETTING DEVICE AND METHOD

[76] Inventor: William B. Smith, Rte. #1, Colton, N.Y. 13625

[21] Appl. No.: 52,352

[22] Filed: Jun. 27, 1979

[51] Int. Cl.³ ............................................ A01M 23/28
[52] U.S. Cl. ...................................................... 43/97
[58] Field of Search .......................... 43/96, 97, 81, 88; 81/3 R

[56] References Cited

U.S. PATENT DOCUMENTS

| 3,462,872 | 8/1969 | Hall ........................................... 43/97 |
| 3,800,463 | 4/1974 | Treadwell ................................ 43/97 |
| 3,896,581 | 7/1975 | Gabry ....................................... 43/81 |
| 4,115,945 | 9/1978 | Hession ................................... 43/97 |

OTHER PUBLICATIONS

"Instructions for Setting Victor Conibear Trap," Animal Trap Company of America, Lititz, Pennsylvania.

Primary Examiner—Nicholas P. Godici

[57] ABSTRACT

A device for setting a rotating frame animal trap is disclosed which comprises a hooked L-shaped rod having a vertical arm, a horizontal arm rigidly attached to and substantially perpendicular to the lower end of said vertical arm, and a downwardly extending hook rigidly attached to the upper end of said vertical arm.

6 Claims, 5 Drawing Figures

TRAP SETTING DEVICE AND METHOD

BACKGROUND OF THE INVENTION

1. Field of the Invention

This invention relates to a device and method for setting a rotating frame animal trap.

2. Description of the Prior Art

In recent years there has been increasing public concern about the use of leg hold animal traps which operate by holding the animal until it dies of starvation or exposure. Animals often will gnaw or twist off a leg in order to escape from such a trap. As a result, humane animal traps, such as the rotating frame trap, which are designed to kill the animal quickly are being used extensively in trapping.

A rotating frame animal trap comprises a pair of similar generally rectangular frames which are pivotally connected at adjacent sides for rotation about a common axis. The end members of the frames form jaws that lie in a common plane and the side members extending from the jaw-forming ends support the jaws. Each of the sides has a central portion in which the frames are pivotally connected through adjacent sides for rotation about the common axis. The traps are provided with trigger means for releasably maintaining the trap in the set position. Each trap has at least one actuator which is capable of rapidly and forcefully rotating the frame. An actuator has two arms spring-biased at one end so that the other end which terminates in rings encircling adjacent sides of both frames on opposite sides of the common axis would move apart, if unobstructed, to a distance substantially greater than the length of the frame sides. When the trigger is released, the frames rotate rapidly about the common axis through an angle of about 90° and the jaw-forming ends forcefully strike the body of the animal that has released the trap.

Because the rings at the ends of the actuator completely encircle the side members of the frames and are capable of exerting a powerful grip, it is difficult and often dangerous to compress the spring-biased actuator and set the trap. There have been instances where trappers have caught both hands in such traps and experienced great difficulty in attempting to free them. Trappers have also experienced difficulty in freeing caught animals from the traps because of their powerful grip. Rotating frame animal traps of this type are disclosed, for example, in U.S. Pat. Nos. 3,010,245, 3,816,955, 4,107,868 and 4,128,961 issued to Frank R. Conibear. Such traps are known in the trade generally as Conibear traps.

A number of devices have been developed for setting Conibear traps. Each of these devices, however, has limitations and drawbacks which preclude their widespread use by all trappers. One such trap setting device is a long pair of tongs. To set a rotating frame trap using such tongs, the trap in the closed position with the two frames extended in a common plane by means of the actuators is laid out so that the ends of the actuators which are spring-biased are pointed directly away from the trap. The hooked ends of the tongs are placed over the two arms of one of the actuators and compressed. A safety hook on the actuator is then set to keep the actuator arms compressed. The second actuator is then similarly compressed by the tongs. With the springbiased ends of the actuators pointing away from the trap, one pair of jaws is pulled apart and rotated about the common axis through an angle of about 90° until each of the jaws is adjacent one of the jaws from the opposite end of the trap. The trigger attached to the middle of one of the jaws is then set in a notched dog attached to the middle of an adjacent jaw. The safety hooks on the actuators are then released so that the trap is in the set position.

Another device which can be used for setting a Conibear trap is disclosed in U.S. Pat. No. 3,800,463 to Treadwell. This trap setter comprises a hollow vertical cylinder having a base or foot piece attached to its lower end perpendicular thereto and a downwardly extending hook attached to its upper end and a T-shaped manually controlled plunger rod slidable within the cylinder and having an upwardly extending hook attached to its lower end which extends through a vertical slot in the cylinder. With the closed trap placed in a vertical position, the hook attached to the upper end of the vertical cylinder is placed around the ring at the end of the actuator which encircles the upper portions of adjacent side members of the trap frames and the hook attached to the lower end of the plunger rod is placed around the end of the actuator which encircles the lower portions of adjacent side members of the trap frames. By placing a foot on top of the base and pulling the plunger rod upward the spring-biased actuator is compressed. The safety hook on the actuator is then set to keep the actuator arms compressed. This procedure is repeated and the trap is then set as described above with respect to the use of the tongs.

A device similar to the Treadwell trap setter is disclosed in U.S. Pat. No. 3,462,872 to Hall et al. Although no reference is made in the patent to the Conibear trap, it appears that the trap setter disclosed could be employed to set a Conibear trap. The Hall trap setter additionally comprises a releasable locking mechanism for maintaining the two hooks a desired distance apart. Hall also provides the lower end of the cylinder with a foot ring instead of a base plate.

A further trap setting device which appears to be suitable for use in setting Conibear traps is disclosed in U.S. Pat. No. 4,115,945 to Hession et al. This device comprises a hollow cylinder with an upwardly extending hook attached to its lower end and a downwardly extending hook attached to the lower end of a rod movable within the cylinder which is slidable in a slot through the side of the cylinder. A ratchet attached to the upper end of the cylinder applies mechanical advantage to the movable rod within the cylinder. The ratchet is operated manually to compress the arms of the actuators of the trap which can then be set as described above.

Each of these prior art trap setting devices, however, has certain drawbacks which preclude its widespread acceptance by trappers. the tongs are long and awkward to use often requiring both hands to compress the arms of the actuators, particularly with the large rotating frame traps. Moreover, because of their size and shape, the tongs cannot be easily carried around by the trapper who often must transport a lot of equipment including many traps. Each additional piece of equipment only increases the hardships already attendant trapping. The trap setting devices of Hall et al. and Treadwell suffer from similar drawbacks. Although they can be operated with one hand, these devices are relatively heavy and large in size and therefore awkward and inconvenient for trappers to transport and use. The trap setting device of Hession et al. possesses the same limitations and drawbacks with respect to size, shape and weight. Thus, none of the prior art trap setting devices suitable for use in setting rotating frame animal traps provides the trapper with a simple lightweight, readily usable and easily portable device capable of setting all sizes of rotating frame traps. Moreover, none of the prior art devices is mechanically simple so that it can be easily manufactured. All of these devices are made up of numerous parts, all of which add to the complexity and weight of the devices.

SUMMARY OF THE INVENTION

The drawbacks and limitations of the prior art trap setting devices have been alleviated by the trap setting device of the present invention. In accordance with the present invention, a device suitable for setting rotating frame animal traps is provided which comprises an L-shaped rod having a vertical arm and a horzontal arm with a downwardly extending hook at the top of the vertical arm of the rod. The device is made from a single piece of metal rod which is bent into the hooked L-shaped configuration, and therefore, is mechanically simpler, smaller, lighter, and much more easily portable or storable than any previous trap setting device.

The device of the present invention is also much easier to use than any prior art rotating frame trap setting device. The trap in the closed position with the two frames extended in a common plane by means of the actuators is placed so that the frames are in a vertical position with the spring-biased ends of the actuators pointing directly away from the trap. The L-shaped trap setter of the present invention is inserted up through both rings at the ends of the arms of one of the actuators and the downwardly extending hook at the top of the vertical arm of the trap setter is placed over the top of the upper ring. The trapper then places his foot on top of the horizontal arm of the trap setter and grasps both of the adjacent upper jaws of the trap with one of his hands. The trap is then pulled upward until the two arms of the actuator are compressed together. The safety hook is then set to keep the actuator arms compressed. The trap setter is then removed from the rings of the actuator and if the trap has a second actuator the trap setter is inserted up through both rings of the second actuator and the procedure is repeated. With the springbiased ends of the actuators pointing away from the trap, one pair of jaws is then pulled apart and rotated about the common axis of the frames through an angle of about 90° until each of the jaws is adjacent the corresponding jaw of the pair from the opposite end of the trap. The trigger attached to the middle of one of the jaws is then set in a notched dog attached to the middle of the now adjacent jaw. The safety hooks on the actuators are then released with the result that the trap is now in the set position.

DESCRIPTION OF THE PREFERRED EMBODIMENTS

Figure 1:
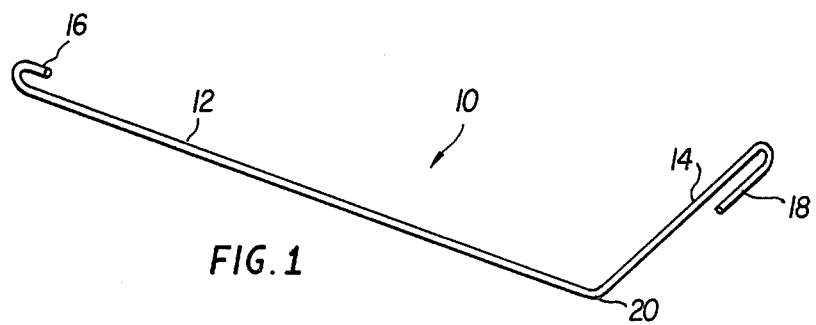
FIG. 1 is a perspective view of a trap setting device in accordance with a preferred embodiment of the present invention.

Referring now to the drawings, FIG. 1 is a perspective view of a trap setting device in accordance with a preferred embodiment of the present invention. The device, referred to generally by the number 10, comprises an L-shaped rod having an elongated vertical arm 12 and a shorter horizontal arm 14. The terms "vertical" and "horizontal" as used herein with respect to the arms of the device refer to the positions of the arms when the device is being used to set a rotating frame animal trap in accordance with the method of the present invention. The upper end of vertical arm 12 is provided with a downwardly extending hook 16. As shown in FIG. 1, the end 18 of horizontal arm 14 is bent back against the side of the arm. Trap setting device 10 can be readily manufactured by bending a single piece of metal rod to form an angle of about 90° at point 20 and by bending the end 16 to form downwardly extending hook 16. Although the exact dimensions of the device are not significant, its dimensions relative to the dimensions of a rotating frame trap are important insofar as the ease with which it can be used and carried by the trapper are concerned, as will be described in further detail below.

Figure 2:
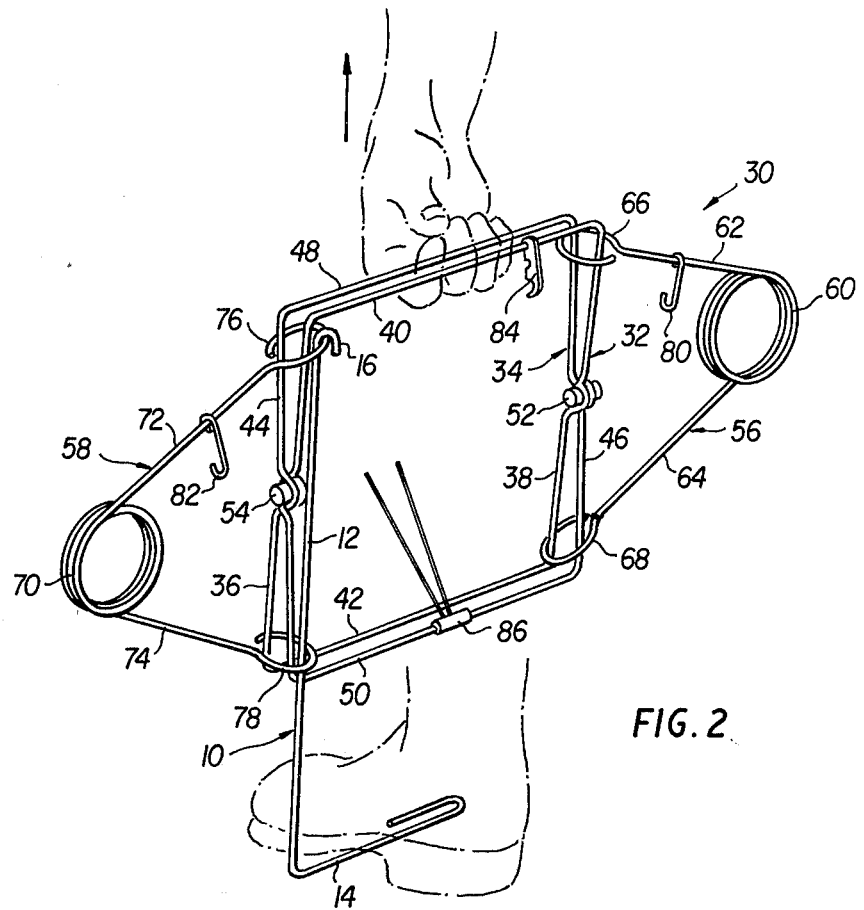

FIGS. 2 to 5 illustrate the method of setting a rotating frame animal trap using the trap setting device shown in FIG. 1. Referring to FIG. 2, a rotating frame animal trap, referred to generally by the number 30, is shown in its closed position. The trap comprises a pair of similar frames 32 and 34. Frame 32 has side members 36 and 38 which support end members 40 and 42. Similarly, frame 34 has corresponding side members 44 and 46 which support corresponding end members 48 and 50. End members 40 and 48 form one pair of jaws and end members 42 and 50 form the other pair of jaws. Adjacent corresponding side members of frames 32 and 34 are pivotally connected by pivot means 52 and 54 so that frames 32 and 34 rotate about a common axis. Trap 30 further comprises at least one spring-biased actuator. Trap 30 is shown in the drawings with two such actuators 56 and 58. Actuator 56 comprises a spring-biased end 60 having two arms 62 and 64 extending therefrom. At the end arm 62 opposite end 60 is a ring 66 which encircles side members 38 and 46 close to end members 40 and 48. Likewise, at the end of arm 64 opposite end 60 is another ring 68 which encircles side members 38 and 46 close to end members 42 and 50. Similarly, actuator 58 comprises a spring-biased end 70 having two arms 72 and 74 extending therefrom with rings 76 and 78 at the other ends of arms 72 and 74, respectively, which encircle side members 36 and 44 at opposite ends thereof. Actuator 56 is provided with a safety hook 80 attached to arm 62 and actuator 58 is provided with a similar safety hook 82 attached to arm 72. Attached to end member 40 is a notched dog 84 having a plurality of notches into which trigger 86 attached to end member 50 is to be placed when the trap is set.

A rotating frame animal trap, such as trap 30 shown in FIG. 2, can be set using trap setting device 10 in accordance with the present invention. First, the upper end of vertical arm 12 of device 10 which has downwardly extending hook 16 is inserted through ring 78 of actuator 58, substantially parallel to side members 36 and 44, and through ring 76 of actuator 58. Hook 16 is then placed around ring 76. In order to compress spring-biased actuator 58, the trapper must then grasp both end members 40 and 48 with his hand as shown in FIG. 2 with broken lines and place trap 30 so that frames 32 and 34 are in a substantially vertical plane. The trapper must then secure device 10 against the ground or other supporting surface by placing his foot on top of horizontal arm 14 and end 18 of device 10 as shown with broken lines in FIG. 2. Since end 18 of arm 14 is bent along the side of arm, both are held flat against the ground by the trapper's foot so that vertical arm 12 is maintained upright. Although the exact dimensions of device 10 are not significant as mentioned above, it is important that the vertical arm 12 extend from one end of the side members past the other end a sufficient distance to permit the trapper's foot to be placed under the end members which form the lower pair of jaws and over horizontal arm 14. It is also important that horizontal arm 14 be sufficiently long to permit the trapper to secure it with his foot as described above. It should be noted, however, that neither vertical arm 12 nor horizontal arm 14 should be any longer than necessary to function properly since any additional length of the arms only increases the weight and awkwardness of the device. A device made from a piece of 3/16 inch spring steel rod which had a vertical arm measuring about 14–15 inches long with a hook at the upper end extending downward about 1 inch and which had a horizontal rm measuring about 4–5 inches long with the end thereof bent back about 2 inches was found to be particularly suitable for setting the large rotating frame animal traps, known in the trade as Conibear 220 and 330 traps.

Figure 3:
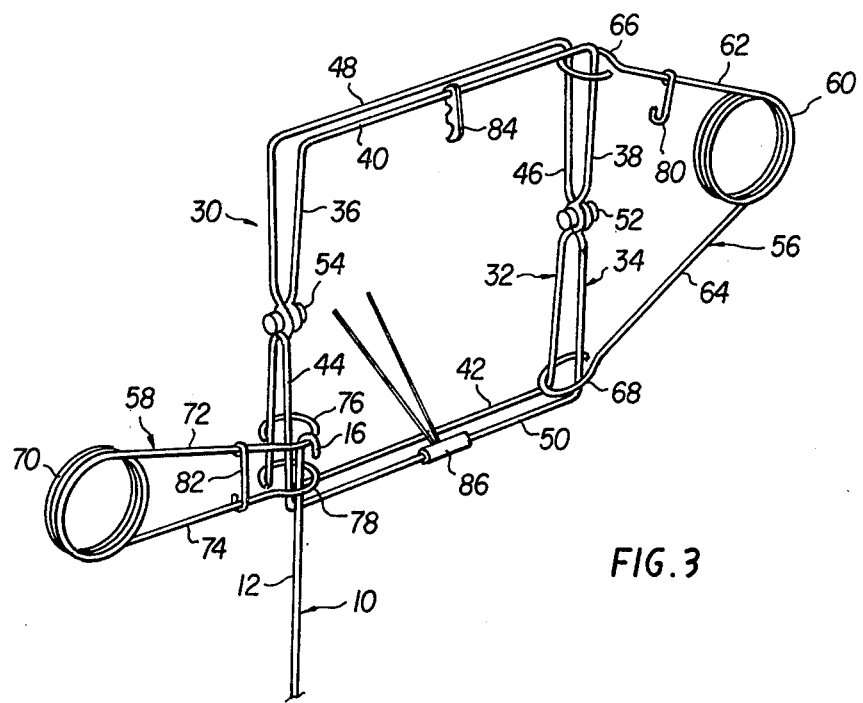

After the trapper has inserted device 10 through both rings of actuator 58 and secured horizontal arm 14 with his foot as described above, he then pulls upward with his hand on end members 40 and 48. As the trapper pulls upward, end members 42 and 50 pull ring 78 upward. Since downwardly extending hook 16 extends over the top of ring 76 holding ring 76 in its original position, the upward movement of ring 78 compresses actuator 58 as shown in FIG. 3. While actuator 58 is held in the compressed position, safety hook 82 on arm 72 is placed around arm 74 thereby maintaining actuator 58 in its compressed state. Device 10 is then removed from within rings 76 and 78 of actuator 58 and inserted in rings 66 and 68 of actuator 56. The above procedure is then repeated to compress actuator 56 and maintain it compressed with safety hook 80.

Figure 4:
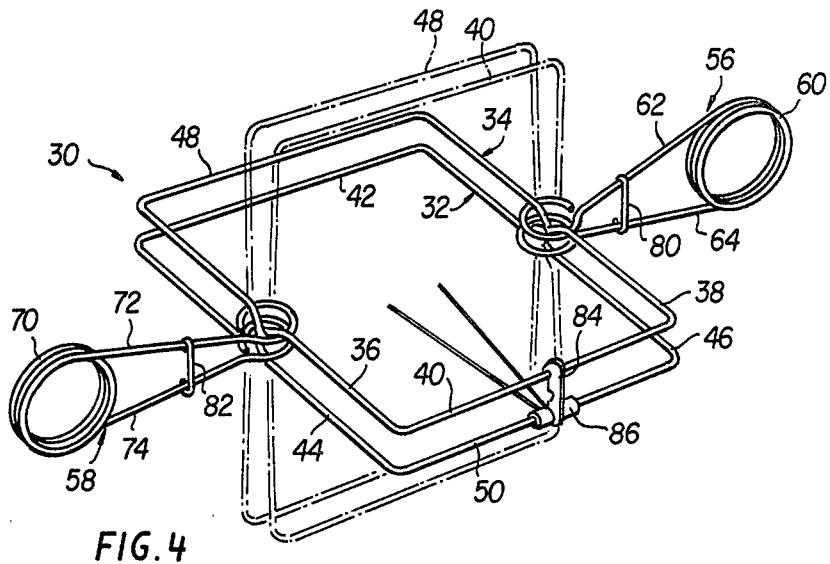
FIGS. 2 to 5 illustrate the method of setting a rotating frame animal trap in accordance with the present invention.

After both actuator 56 and 58 have been compressed and set with safety hooks, they are then positioned so that the spring-biased ends 60 and 70 thereof are pointing away from frames 32 and 34 and the ends having the rings are adjacent pivot means 52 and 54, as shown in FIG. 4. At this point frames 32 and 34 are positioned vertically as shown with broken lines in FIG. 4. The trapper then grasps end member 40 with one hand and end member 48 with the other hand and pulls them apart thereby rotating frames 32 and 34 through an angle of about 90° until they are in a horizontal position as shown. Trigger 86 attached to end member 50 is then set in one of the notches in dog 84 attached to end member 40.

Figure 5:
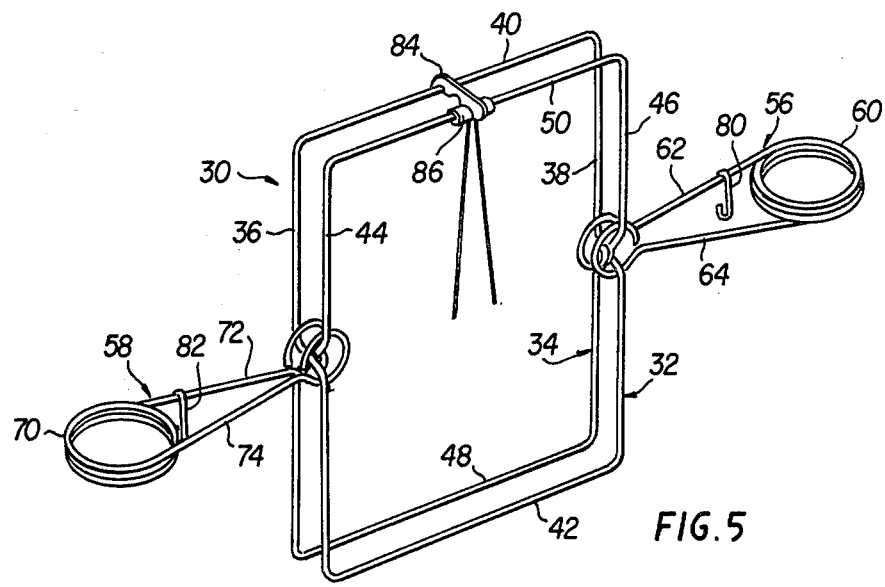

Frames 32 and 34 of trap 30 are then rotated through an angle of about 90° and the trap is placed in a vertical position in the desired location on the ground or other surface. The trapper then slowly releases safety hooks 80 and 82 and slides them to spring-biased ends 60 and 70 of actuators 56 and 58, respectively, while making sure that his hands are clear of frames 32 and 34. Trap 30 is now in the set position as shown in FIG. 5.

Using the trap setting device of the present invention, rotating frame animal traps of all sizes can be set quickly and safely. Since there are not moving parts, the device is easy to manufacture and easy to use. The device is so simple to use that even in the event that a trapper's fingers or hands were caught in the trap accidentally while setting it, the device could be used to compress the actuators so that the trapper's fingers or hands could be freed. Moreover, since the device is relatively small and lightweight, it can be readily carried or stored by the trapper.

What is clamed is:

1. A device for setting a rotating frame animal trap of the type comprising two similar frames pivotally connected at adjacent sides for rotation about a common axis, each of said frames having two jaw-forming end members that lie in a common plane and side members extending therebetween to support said end members, said side members each having a central portion in which the frames are pivotally connected through adjacent sides for rotation about a common axis between a set position and a closed position, at least one actuator capable of rapidly and forcefully effecting said rotation, said actuator having two arms which are spring-biased at one end and each of which terminates in a ring at the other end which encircles adjacent sides of both frames on opposite sides of said common axis, and a trigger means for releasably maintaining the trap in the set position, wherein said device comprises a single piece of hooked L-shaped rod consisting of a vertical arm, a horizontal arm rigidly attached to and substantially perpendicular to the lower end of said vertical arm, the end of said horizontal arm being bent back parallel to the remainder of said horizontal arm to form a support to permit its being secured against a horizontal surface by a human foot, and a downwardly extending hook bent from the upper end of said vertical arm, wherein the length of said vertical arm is such that when the hook attached to said vertical arm is placed adjacent to one of the end members of one of the frames the vertical arm extends the length of the side members of said frame and beyond the other end member of said frame a distance sufficient to permit a human foot to be inserted between said end member and said horizontal arm, and wherein the length of said horizontal arm is sufficient to permit its being secured against a horizontal surface by a human foot.

2. The device of claim 1 wherein the hooked L-shaped rod is made from a single piece of metal rod.

3. The device of claim 2 wherein the metal rod is made of 3/16 inch spring steel.

4. The device of claims 1, 2 or 3 wherein the vertical arm has a length of about 14–15 inches and the horizontal arm has a length of about 4–5 inches.

5. A method for setting a rotating frame animal trap of the type comprising two similar frames pivotally connected at adjacent sides for rotatio. about a common axis, each of said frames having two ja v-forming end members that lie in a common plane and side members extending therebetween to support said end members, said side members each having a central portion in which the frames are pivotally connected through adjacent sides for rotation about a common axis between a set position and a closed position, at least one actuator capable of rapidly and forcefully effecting said rotation, said actuator having two arms which are spring-biased at one end and each of which terminates in a ring at the other end which encircles adjacent sides of both frames on opposite sides of said common axis, and a trigger means for releasably maintaining the trap in the set position, with a device which comprises a hooked L-shaped rod comprising a vertical arm, a horizontal arm rigidly attached to and substantially perpendicular to the lower end of said vertical arm, and a downwardly extending hook rigidly attached to the upper end of said vertical arm, wherein the length of said vertical arm is such that when the hook attached to said vertical arm is placed adjacent to one of the end members of one of the frames the vertical arm extends the length of the side members of said frame and beyond the other end member of said frame a distance sufficient to permit a human foot to be inserted between said end member and said horizontal arm, and wherein the length of said horizontal arm is sufficient to permit its being secured against a horizontal surface by a human foot, said method comprising:

(a) inserting the end of the vertical arm of the device with the downwardly extending hook through both of the rings at the end of the arms of one of the actuators of the trap and placing the hook around the second ring, (b) grasping both of the adjacent end members of the two frames nearest the hooked end of the device and holding the frames so that their common plane is substantially vertical, (c) securing the horizontal arm of the device against a horizontal surface, (d) pulling upward on the end members thereby compressing the actuator, (e) positioning the two rings of the compressed actuator adjacent the central portion of the adjacent side members with the spring-biased end of said actuator pointing away from the trap, (f) rotating each frame through an angle of about 90° in a direction opposite that of the other frame, and (g) engaging a trigger means for releasably maintaining the trap in a set position.

6. The method of claim 5 wherein the trap comprises two actuators and steps (a) through (e) inclusive are repeated to compress the second actuator prior to steps (f) and (g).

* * * * *